United States Patent Office 3,155,736
Patented Nov. 3, 1964

3,155,736
METHOD OF MAKING ORGANOLITHIUM
COMPOUNDS
Oscar Francis Beumel, Jr., West Chester, Pa., assignor to Foote Mineral Company, Philadelphia, Pa., a corporation of Pennsylvania
No Drawing. Filed July 9, 1962, Ser. No. 208,628
8 Claims. (Cl. 260—665)

This invention relates to a method of making lithium compounds and more particularly provides a novel method of making organolithium compounds which has important economic advantages.

It is known that organolithium compounds can be prepared by contacting lithium metal with the corresponding organo chloride according to the following general reaction, hereafter referred to as reaction I:

(I) $\quad\quad 2Li + RCl \rightarrow RLi + LiCl$ wherein R is an organic radical. Lithium metal, however, is expensive and in the synthesis of organolithium compounds as set forth in the above reaction approximately one-half of the lithium metal is consumed in the formation of a commercially unattractive by-product, lithium chloride sludge. The value of lithium is such that heretofore it has been necessary to resort to expensive processing of this by-product, lithium chloride sludge material, to recover the lithium therefrom.

It is an object of this invention to provide an improved method for the preparation of organolithium compounds. A particular object of this invention is to provide a novel method for the preparation of organolithium compounds wherein the by-product of the process is of substantially negligible economic value, and can be discarded without loss.

A further object of this invention is to provide a novel method for the preparation of organolithium compounds using a low cost lithium chloride sludge by-product as a reactant, wherein selective formation of an organometallic compound in which the metal component is lithium occurs.

These and other objects will become evident from a consideration of the following specification and claims.

It has been found that organolithium compounds can be prepared by contacting lithium chloride sludge with an organo-sodium compound in an inert solvent medium to form a soluble organolithium compound and an insoluble sodium halide.

More particularly, it has now been found that by reacting lithium chloride sludge with either (a) an organic halide and sodium metal, or (b) an organo sodium compound; an organolithium compound is unexpectedly formed with the by-product of either reaction being a sodium halide salt. Equations illustrative of these novel reactions are:

(II) $\quad LiCl\ (sludge) + 2Na + RX \rightarrow RLi + NaX + NaCl$ (III) $\quad\quad LiCl\ (sludge) + RNa \rightarrow RLi + NaCl$ wherein R is an alkyl radical having from 3 to 22 carbon atoms and X is a halide such as chlorine, bromine and iodine. These reactions will hereafter be referred to as reactions II and III, respectively.

Although either reaction II or III gives satisfactory yields of organolithium products when using lithium chloride sludge, the process of the invention is particularly effective when the organosodium compound is produced in the presence of the lithium chloride, that is, when the reactants, lithium chloride, alkyl chloride and a sodium metal dispersion are reacted according to Equation II.

The stated novel process of this invention has important economic advantages particularly when used in conjunction with the previously known method for the preparation of organolithium compounds which has a by-product thereof lithium chloride sludge. The only significant by-product of the instant process is sodium chloride which in contrast to lithium chloride is of negligible economic value and can simply be discarded. As discussed above, the isolation of a substantially pure organolithium product is also simple and readily accomplished so that the method involves few manipulative procedures. Thus, the process of the instant invention can be employed to supplement commercial processes wherein organolithium compounds are produced due to the formation of a lithium chloride sludge. The instant process can be used either as a supplement to such a process or it can be used alternatively with such a process and in either fashion the process of the instant invention provides a method for virtually complete conversion of all the lithium metal used in an overall process of producing organolithium compounds, with only negligible lithium metal lost in the form of unusable by-products.

A reaction between lithium chloride sludge and either alkyl sodium or alkyl chloride in the presence of sodium metal is wholly unexpected and unobvious. That is, when commercially available anhydrous lithium chloride is mixed with alkyl sodium or alkyl choride in the presence of sodium metal under reaction conditions similar to those used in Equations II and III, no reaction between the lithium chloride and the alkyl compound is produced. In light of these results it would be difficult to predict that lithium chloride sludge would behave differently from the anhydrous crystalline material to produce organolithium compounds according to Equations II and III above.

The selectivity of the presently provided novel reactions as set forth in Formulas II and III above is also quite unexpected, for the organolithium product of the invention is essentially free from organosodium compounds. The organolithium product remains dispersed or dissolved in the hydrocarbon reaction medium, whereas the sodium halide salt by-product crystallizes promptly and completely from the reaction mixture, and can readily be separated from the supernatant liquid layer comprising the organolithium compound.

The lithium chloride sludge used in the process of the invention can be defined as the lithium chloride by-product from a reaction having as its primary product organolithium. The lithium chloride sludge can be produced according to reaction I above and should preferably be free from contaminants, however, the presence of lithium metal can be tolerated since under the conditions of the process any lithium metal present would be converted to an organo-lithium compound. The lithium chloride sludge composition is usually maintained in an inert solvent such as hexane.

The physical structure of the lithium chloride sludge used in the process of the invention has been studied and compared with commercially available anhydrous lithium chloride crystalline products. Under X-ray examination it was found that lithium chloride sludge particles were crystalline in structure. Microscopic examination showed the particle size of the sludge constituents to be approximately the same as the commercially available anhydrous product. However, the crystals in the sludge form tend to agglomerate into relatively large amorphous particles. Therefore, there appears to be no significant physical differences between the sludge and crystalline form of lithium chloride to justify the marked differences in behaviour with respect to reactions II and III above. These behaviour differences have been discussed above and will be further evident from the examples set forth below.

The lithium chloride crystalline product which is available commercially and which is used in the following examples for comparative purposes is an anhydrous material recrystallized from water and subsequently ground to a relatively fine particle size. Ether is commonly employed as the reaction media in the synthesis of organolithium compounds since lithium chloride is soluble in ether.

Any of a wide variety of organo halides can be converted to organolithium compounds by the process of this invention. The only significant limitation on the organo halide employed is that it be capable of forming the corresponding organosodium compound. That is, if the organosodium compound can be formed from the corresponding organo halide, then the reaction of the organosodium compound with the lithium chloride sludge will take place according to reactions II and III above. Preferred aliphatic halides which may be used in the process of this invention are acyclic halides containing from 3 to 22 carbon atoms such as n-propyl chloride, n-butyl chloride, amyl chloride, hexyl chloride, octyl chloride, nonyl chloride, decyl chloride, undecyl chloride, hexadecyl chloride and docosyl chloride. Particularly preferred are the aliphatic halides having from 4 to 10 carbon atoms. Various branched aliphatic halides may be used, however, stearic hindrance may interfere with the formation of the corresponding intermediate organosodium compound, therefore primary halides and primary halides of branched aliphatic compounds wherein the branching is remote from the carbon atom having the halide attached thereto are preferred. Organo halides which are unsaturated or which have substituent groups other than those made up solely of carbon and hydrogen can also be used. As to organo halides containing unsaturation it is essential that the unsaturation does not hinder the formation of the intermediate organosodium compound. For example, aromatic halides such as phenyl chloride can be used to form the intermediate phenylsodium and the corresponding phenyllithium product. This particular reaction should be conducted in an ether reaction media. It is further necessary that if any substituent groups are present on the alkyl chloride they should not be reactive under the conditions of the process with the alkali metal dispersion or the lithium chloride sludge to any substantial degree. In a preferred embodiment of the invention the organo halide contains only hydrogen and carbon atoms and the requisite halide atom. Other organo halides such as organo bromides and iodides may also be employed in the reaction if desired. However, by using organo chlorides the formation of Wurtz-type by-products is minimized. The organo halide can be in a gaseous state. That is, it can be introduced into the liquid reaction mixture in the form of a gas which would condense in the liquid reaction media.

The reactivity of sodium metal in the inert reaction medium is a function of its particle size, therefore dispersing the sodium metal in fine discrete particles in an inert liquid medium is a preferred method of introducing the sodium to the reaction medium. Methods of forming a dispersion of sodium metal in liquid media are well known in the art. A dispersion can be prepared by fusing sodium in an inert liquid and subjecting the entire mixture to vigorous agitation while maintaining it at a temperature at which the sodium is in the molten state. The vigorous agitation can be accomplished by using a high-speed agitator such as a turbine agitator operating with sufficient force to subdivide the sodium to the desired particle size. In general, it is desirable that all the sodium particles be below 500 microns in diameter with the average particle diameter being not more than about 100 microns. The average particle diameter may advantageously be lower, for example, of not more than 10 microns, and preferably on the order of three microns or less. If desired the dispersion can be introduced into a suitable mill such as a homogenizer which will still further reduce the particle size.

If desired, dispersing agents may be employed in preparing the sodium dispersions. Useful dispersing agents for the preparation of alkali metal dispersions are well known in the art; they include, for example, dimerized linoleic acid, oleic acid, aluminum stearate, aluminum laurate, calcium stearate, lead naphthenate, and other metallic soaps, lecithin, colloidal carbon, dispersed polymers such as polyethylene, rubbers and the like, and many others. Although the use of such agents which are useful for the facilitation of the dispersion of alkali metals in a liquid medium is not necessary in the practice of the present invention, they may be used if desired. Generally they are added to the mixture of sodium metal and liquid medium before agitation to disperse the sodium is applied.

The liquid medium used: (a) in the sodium dispersion, (b) with the lithium chloride sludge, and (c) as the reaction medium, should be non-reactive and preferably have a boiling point above the temperature at which the dispersion or sludge is prepared and above the reaction temperature of the process. (However, liquids having a boiling point below such temperatures may be used provided the operations are carried out under pressure.) In addition to serving as a carrier for the various reactants the solvent moderates the reaction and facilitates heat removal. High-flash hydrocarbon solvents such as mineral oils, for example white oil, or refined diesel fuels can be advantageously used because of the low fire hazard they present. However, any of a wide variety of inert organic solvents or diluents can be used, for example fluid hydrocarbon solvents containing from 4 to 14 carbon atoms, free from ethylenic unsaturation such as petroleum ether, pentane, cyclopentane, hexane, cyclohexane, heptane and mineral spirits; petroleum hydrocarbons of various kinds, aromatics such as benzene, and mixtures of the above materials. Certain solvents such as toluene and xylene are readily metallated by the intermediate alkylsodium compounds and form the corresponding organometallic such as toluylsodium; therefore the use of such solvents must be avoided. It is preferred that the liquid reaction media used be free of impurities which are highly reactive with sodium or the lithium chloride sludge, or with the reaction mixture components in which it is intended to be used, that is, the organo halide and the resulting organolithium product. Thus, materials such as water, alcohols, olefins and the like should preferably be absent. In selecting the liquid medium, it is to be noted that certain of the mentioned liquid reaction media, here characterized as inert, may react with the organolithium product of the reaction under certain conditions, and where occurrence thereof would be disadvantageous, the liquid medium for the metal dispersions should be selected to avoid such an effect. In general it is desirable that the solvent be present to the extent of at least about 40% and preferably about 50 to about 80% based on the total volume of reactants and solvent.

In one embodiment of the invention the sodium metal and lithium chloride sludge can be codispersed, that is, dispersed simultaneously in the same liquid medium and the organo halide added thereto. In another embodiment of the invention the sodium metal dispersion/organo halide mixture is added simultaneously to a lithium chloride sludge maintained in an inert reaction medium. As discussed previously it has been found that the in situ reaction of the organic halide with sodium in the presence of the lithium chloride sludge produces higher yields of organolithium compounds than the reaction wherein the sodium metal is reacted with the organo halide prior to introduction of the lithium chloride sludge (see Example IV below).

In carrying out the present process the reactants need simply be contacted with one another. Since sodium, the lithium chloride sludge and the organolithium products of the reaction can be spontaneously flammable, as inert liquid as described above will ordinarily be used as a reaction medium. Conversion of an organo halide by reaction with sodium metal can be accomplished simply by adding the organo halide to a vessel containing the metal, in a finely divided state, and covered by an inert liquid and an inert atmosphere thereby avoiding spontaneous combustion of the sodium metal.

The organo halide, the lithium chloride sludge and the sodium metal can be introduced into the reaction vessel simultaneously. It is generally desirable to have an excess of the sodium metal present at all times in order to avoid the reaction of the organolithium product with the organo halide starting material, that is, the occurrence of the Wurtz or Fittig reactions. Depending on the amount of liquid provided by the sodium metal dispersion and the lithium chloride sludge/inert solvent mixture it may be desirable to add additional solvent or diluent to the reaction mixture. In a preferred embodiment the reaction medium, the dispersing medium for the sodium metal and the carrier medium for the lithium chloride sludge is the same inert solvent. It is understood, of course, that if different solvents are used for the various reactants that they be miscible so as to avoid the formation of a multi-phase reaction medium.

It is preferred to employ the reactions in approximately equivalent proportions. However, the ratio of the lithium chloride sludge to sodium metal may range from about 0.2 to about 5 moles. The preferred ratio of lithium chloride sludge to sodium in reaction III of the invention will generally be equimolar, whereas in reaction II the ratio is 1:2. In order to keep the organolithium product from being contaminated by organosodium compounds it is necessary to provide an amount of lithium chloride sludge to the reaction which is at least a molar equivalent of the amount of organic halide reacted therewith. Sometimes a slight excess of the lithium chloride sludge over a molar equivalent of organo halide or organosodium compound will be employed to facilitate completion of the conversion thereof to the organolithium compound. The ratio of lithium chloride sludge to organo halide can therefore range from about 1:1 to about 2:1.

The temperature at which the reaction mixture will be maintained during formation of the organolithium compound will generally not be substantially above about room temperature. Generally no heating is required to induce the reactants to react, and ordinarily, they react with such vigor that it is necessary to cool the reaction mixture to avoid loss of control of the reaction. The products of the reaction are also usually relatively unstable and tend to decompose on exposure to elevated temperatures. Thus the reaction temperature will generally range from about room temperature down to any temperature below that at which the reaction rate is not so greatly slowed as to be impractical. If it is desired to conduct the process above room temperature, extremely efficient cooling and or reaction quenching means should be provided. Ordinarily the reaction will be conducted at atmospheric pressure, but sub- or superatmospheric pressures may be used if desired. It is desirable to exclude air, moisture or other materials which are reactive with the reactants thus the reaction would usually be conducted under an atmosphere of inert gas such as nitrogen, argon, and so forth. The usual procedure for carrying out the reaction will generally consist of adding the organo halide slowly to the lithium chloride sludge containing sodium metal. The organo halide generally reacts with the sodium metal as rapidly as it is added, and reaction between the lithium chloride sludge and the organosodium is also quite rapid. To insure complete reaction, the reaction mixture should be stirred for a period of time, such as from 2 to 10 hours at room temperature, after addition of the organo halide is complete. It is to be appreciated that while batch procedures may often be most useful when handling a reaction mixture containing such highly reactive components as that here involved, with suitable equipment, the method of this invention may also be used in conducting the present process continuously.

After the reaction is complete, the by-product sodium halide will settle out on standing, leaving the organolithium composition in the supernatant layer, as a substantially pure product. The product can be separated from the by-product, sodium halide salt, by decanting it off, or by any other convenient isolation procedure. The precipitate comprising sodium halide can be discarded. The separated liquid portion of the reaction mixture comprising the organolithium compound product, can be stored, with suitable precautions, until use, with or without concentration thereof by removal of liquid reaction medium.

The present invention will be more readily understood from a consideration of the following specific examples which are given for the purpose of illustration only and are not intended to limit the scope of the invention in any way.

The following example illustrates the preparation of lithium chloride sludge from an alkyl chloride and lithium metal according to reaction I above.

*Example I*

A dispersion of 19.2 grams (2.75 moles) of lithium in 324.4 grams of hexane is prepared by a high speed agitation method. To the dispersion which is stirred and which is maintained under an atmosphere of argon 120.0 grams (1.30 moles) of n-butyl chloride are added dropwise over a period of 3 hours. Initially the temperature of the reaction mixture is allowed to reach 35° C. and then external cooling is applied to maintain a temperature of 15±5° C. during addition of the butyl chloride. When all the butyl chloride has been added, cooling is discontinued and stirring is continued for 1 hour, after which stirring is stopped and the reaction mixture is allowed to settle. The clear, colorless, supernatant liquid is decanted and analyzed for its butyllithium content. 69.75 grams (1.09 moles) of n-butyllithium are produced which represents a yield of 84% based on the amount of n-butyl chloride used. The insoluble lithium chloride sludge present is repeatedly washed with hexane until it contains only 0.3 g. of n-butyllithium.

In the following example the preparation of an alkyl lithium compound from lithium chloride sludge, according to Equation II above is illustrated.

*Example II*

To a lithium chloride sludge produced as described in Example I above, containing 1.30 moles of lithium chloride and 0.33 mole of lithium metal, a mixture of 120 grams (1.30 moles) of n-butyl chloride and 58.9 grams (2.56 moles) of sodium metal in 417.4 grams of hexane is slowly added; while the reaction temperature is maintained at about 13° C. by external cooling. On completion of the addition of n-butyl chloride and sodium metal the temperature is allowed to raise to 30° C. The sodium chloride precipitate is separated from the supernatant liquid portion of the reaction mixture and the latter analyzed for its organolithium compound content. It is found to be a substantially pure solution of n-butyllithium containing 63.5 grams (0.992 mole) of the product corresponding to a yield of 76% of theoretical, based on the amount of n-butyl chloride used.

The above results indicate that an organolithium compound can be produced using lithium chloride as one of the reactants. For if all the lithium metal present (0.33 mole) in the above described sludge material was converted to n-butyllithium approximately two thirds of the final reaction product (about 0.66 mole) would still have been derived from the lithium chloride sludge.

The following example illustrates the rate of reactivity of lithium chloride sludge with an organo halide in the presence of sodium metal.

*Example III*

To a mixture of the lithium chloride sludge 25.2 grams (0.60 mole), produced as described in Example I above, and hexane, 26 grams (1.13 moles) of sodium metal and 47.2 grams (0.51 mole) of n-butyl chloride is added over a period of 65 minutes with the temperature of the reaction mixture maintained at 15° C. by external cooling. The mixture is stirred after the addition of the reactants is completed and samples are removed periodically for analysis. The following yields are based on the n-butyl chloride added:

After 1.6 hours—48.5% yield
After 3.3 hours—60.0% yield
After 6.3 hours—69.5% yield
After 22.8 hours—75.3% yield The following example illustrates the preparation of various organolithium compounds from lithium chloride sludge and various organo halides according to general reactions II and III above.

*Example IV*

The procedure of Example II is followed in reacting two moles of sodium metal, one mole of lithium chloride sludge, produced according to Example I above, and one mole of n-octyl chloride in a hexane solvent. The temperature of the reaction mixture is maintained at 5° C. for 6 hours. The yield is 61% of theoretical. It is understood that alkyllithium compounds such as n-tetradecyllithium, n-hexadecyllithium and n-docosyllithium can be prepared in a manner similar to that employed in preparing n-octyllithium above.

In another series of reactions conducted according to Example II above, one mole of butylsodium is added to a lithium chloride sludge produced as described in Example I, in hexane. The temperature of the reaction is maintained at 25° C. for six hours. The average yield for two runs is about 19% of theoretical. Under similar reaction conditions, phenyl sodium could be reacted with lithium chloride sludge in an ether reaction media to produce phenyllithium.

In the following examples commercially available anhydrous lithium chloride is combined with butylsodium at varying temperatures in a manner similar to that described in Examples II and III above.

*Example V*

To anhydrous lithium chloride which is ground with a mortar and pestle to a fine particle size is added hexane solvent and butyl sodium prepared from butyl chloride and sodium metal in a hexane solution. The procedure described in Examples II and III above was followed at varying temperatures for six hours. The following equations summarize the results of these several experiments:

(a) $C_4H_9Na + LiCl \xrightarrow{-5° C.}$ No Reaction (b) $C_4H_9Na + LiCl \xrightarrow{+5° C.}$ No Reaction (c) $C_4H_9Na + LiCl \xrightarrow{30° C.}$ No Reaction In the following example commercially available anhydrous lithium chloride similar to that used in Example V was combined with an alkyl chloride and sodium according to general reaction II above.

*Example VI*

To a dispersion of 0.1 mole lithium metal and one mole lithium chloride in hexane is added a mixture of one mole of n-butyl chloride and a sodium metal dispersion in hexane, following the procedure described in Example II above. After 24 hours, the yield is 0.05 mole n-butyllithium which is less than could be produced from the lithium metal present.

In a second test conducted according to the procedure described in Example II, 0.95 mole of butyl chloride and 1.9 mole sodium metal dispersion in a hexane solvent are added to 0.95 mole lithium chloride and 0.1 mole n-butyl lithium in a hexane solvent. After 24 hours the yield is 0.086 mole n-butyllithium which is slightly less n-butyllithium than was present initially.

In a third reaction conducted according to the procedure described in Example II, one mole of n-butyl chloride and 1.75 moles sodium in hexane are added to a hexane solution containing 0.25 mole lithium and one mole lithium chloride. After 24 hours 0.20 mole of n-butyllithium is produced which is less than could be produced from the amount of lithium metal present.

Examples V and VI illustrate the unexpected reactivity of lithium chloride sludge according to Equations II and III as compared to commercially available anhydrous lithium chloride.

While the invention has been described with reference to various preferred embodiments thereof, it will be appreciated that modifications and variations can be made without departure from the invention.

I claim:
1. The method of preparing alkyllithium compounds comprising contacting lithium chloride sludge with a mixture of sodium metal and an alkyl halide having the structural formula: RX, wherein R is an alkyl radical having from 3 to 22 carbon atoms and X is a halide radical, to form a corresponding alkyllithium compound and a sodium halide.
2. The method of claim 1 in which said alkyl halide is an alkyl chloride.
3. The method of claim 2 in which said alkyl chloride is an n-alkyl chloride.
4. The method of preparing organolithium compounds which comprises contacting an alkyl chloride with an equimolar mixture of codispersed sodium metal and lithium chloride sludge in an inert liquid reaction medium and thereafter separating the precipitated sodium chloride from the liquid layer of the resulting reaction mixture, said liquid layer comprising substantially pure organolithium product.
5. The method of preparing n-butyllithium which comprises contacting lithium chloride sludge with n-butyl chloride and sodium metal in an inert solvent.
6. The method of preparing n-octyllithium which comprises contacting lithium chloride sludge with n-octyl chloride and sodium metal in an inert solvent with the reactants being present in equivalent amounts.
7. The method of preparing alkyllithium compounds which comprises contacting:
   (a) lithium chloride sludge formed by the reaction $2Li + RCl \rightarrow RLi + LiCl$ (sludge) wherein R is an organo radical, with,
   (b) a mixture of sodium metal and an alkyl halide having the structural formula: RX wherein R is an alkyl radical having from 3 to 22 carbon atoms and X is a halide radical, to form the corresponding alkyllithium compound and sodium chloride.
8. The method of preparing alkyllithium compounds which comprises contacting lithium metal with an organo chloride to form the corresponding organolithium compound and lithium chloride sludge, contacting the lithium chloride sludge with a mixture of sodium metal and an alkyl halide having the structural formula: RX, wherein R is an alkyl radical having from 3 to 22 carbon atoms and X is a halide radical, to form a corresponding alkyllithium compound and a sodium halide.

References Cited in the file of this patent

Rochow et al.: The Chemistry of the Organometallic Compounds (1957), pages 17, 51 and 67.